United States Patent
Schick

(10) Patent No.: US 9,404,741 B2
(45) Date of Patent: Aug. 2, 2016

(54) COLOR CODING FOR 3D MEASUREMENT, MORE PARTICULARLY FOR TRANSPARENT SCATTERING SURFACES

(71) Applicant: SIEMENS AKTIENGESELLSCHAFT, München (DE)

(72) Inventor: Anton Schick, Velden (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/415,803

(22) PCT Filed: Apr. 26, 2013

(86) PCT No.: PCT/EP2013/058748
§ 371 (c)(1),
(2) Date: Jan. 20, 2015

(87) PCT Pub. No.: WO2014/016001
PCT Pub. Date: Jan. 30, 2014

(65) Prior Publication Data
US 2015/0176983 A1  Jun. 25, 2015

(30) Foreign Application Priority Data

Jul. 25, 2012 (DE) .......................... 10 2012 213 084

(51) Int. Cl.
*G01B 11/25* (2006.01)
*G01B 11/00* (2006.01)
(52) U.S. Cl.
CPC .......... *G01B 11/2509* (2013.01); *G01B 11/005* (2013.01)

(58) Field of Classification Search
CPC .......... G01B 11/2509; G01B 11/2513; G01B 11/2527; G01B 21/254; G01B 11/24; G01B 11/25; G01B 11/2518; G01N 2021/1785; G06T 1/0007
USPC .................................................. 356/601–623
See application file for complete search history.

(56) References Cited

U.S. PATENT DOCUMENTS

| 7,349,104 B2 | 3/2008 | Geng |
| 2003/0223083 A1 | 12/2003 | Geng |

(Continued)

FOREIGN PATENT DOCUMENTS

| DE | 19963333 A1 | 7/2001 |
| EP | 1577641 A2 | 9/2005 |

(Continued)

OTHER PUBLICATIONS

Caspi D. et al: Range Imaging with Adaptive Color Structured Light; IEEE Transactions on Pattern Analysis and Machine Intelligence, vol. 20, No. 5, May 1998, pp. 470-480.

(Continued)

*Primary Examiner* — Hoa Pham
(74) *Attorney, Agent, or Firm* — Schmeiser, Olsen & Watts, LLP

(57) ABSTRACT

A device and a method for determining three dimensional surface coordinates of an object by means of optical color triangulation are proposed, wherein all lines of a color fringe pattern in each case have a width (BR) set in such a way that, in a recorded image of the line, all contrast maxima (CMax), of all spectral components of a line are equal to a minimum contrast value (CMin) is provided. Proceeding from an invariable smallest width of a pattern line with a spectral component of highest contrast, further lines can be correspondingly widened. The invention is particularly advantageously suitable for a 3D measurement for biological tissue.

18 Claims, 3 Drawing Sheets

(56) References Cited

U.S. PATENT DOCUMENTS

| | | | | |
|---|---|---|---|---|
| 2006/0072122 | A1* | 4/2006 | Hu | G01B 11/2527 356/603 |
| 2007/0115484 | A1* | 5/2007 | Huang | G01B 11/2527 356/604 |
| 2007/0206204 | A1* | 9/2007 | Jia | G01B 11/254 356/604 |
| 2007/0211258 | A1* | 9/2007 | Lee | G01B 11/25 356/605 |
| 2010/0188400 | A1* | 7/2010 | Chen | G06T 7/0057 345/420 |
| 2010/0207938 | A1* | 8/2010 | Yau | G01B 11/2513 345/419 |
| 2010/0253773 | A1 | 10/2010 | Hamano | |
| 2011/0287387 | A1 | 11/2011 | Chen | |
| 2011/0298891 | A1* | 12/2011 | Zhang | G01B 11/2509 348/43 |
| 2012/0062724 | A1* | 3/2012 | Yokota | A61B 1/00009 348/82 |
| 2012/0082383 | A1 | 4/2012 | Kruglick | |
| 2013/0218531 | A1* | 8/2013 | Deichmann | A61C 9/004 703/1 |
| 2015/0070473 | A1* | 3/2015 | Wang | G01B 11/2509 348/49 |

FOREIGN PATENT DOCUMENTS

| | | |
|---|---|---|
| EP | 2236979 A2 | 10/2010 |
| JP | 2001338863 A | 12/2001 |
| JP | 2002544510 A | 12/2002 |
| JP | 2003518614 A | 6/2003 |
| JP | 2010246899 A | 11/2010 |
| WO | WO 0070303 A1 | 11/2000 |
| WO | WO 0148438 A1 | 7/2001 |
| WO | WO 2012007003 A1 | 1/2012 |

OTHER PUBLICATIONS

Koninckx T. et al.: Real-time Range Scanning of Deformable Surfaces by Adaptively Coded Structured Light; 3-D Digital Imaging and Modeling, 2003, Proceedings. Fourth International Conference on 3Dim 2003, pp. 293-300.

International Search Report for International Application No. PCT/EP2013/068748, mailed on Jul. 4, 2013.

Notice of Allowance for Korean Application No. 10-2015-7004883, dated May 20, 2016.

* cited by examiner

COLOR CODING FOR 3D MEASUREMENT, MORE PARTICULARLY FOR TRANSPARENT SCATTERING SURFACES

CROSS-REFERENCE TO RELATED APPLICATIONS

This application claims priority to PCT Application No. PCT/EP2013/058748, having a filing date of Apr. 26, 2013, based off of DE 102012213084.5 having a filing date of Jul. 25, 2012, the entire contents of which are hereby incorporated by reference.

FIELD OF TECHNOLOGY

The following relates to apparatuses for determining three-dimensional surface coordinates of an object by means of optical color triangulation and corresponding methods.

BACKGROUND

The measurement of the third dimension of a surface is becoming increasingly important in many areas of medical technology. By way of example, in minimally invasive surgery the absence of the size and distance estimation via the direct view has to be replaced by measuring methods. Furthermore, surface data obtained for example within the abdomen during an operation can be matched with data recorded by other diagnostic methods, such as, for example, magnetic resonance, computed tomography or ultrasound methods, in order to better identify or localize organs or diseased tissue. Changes as a result of a "new" position of the patient during an operation or as a result of periodic position changes caused by respiration, for example, are likewise intended to be taken into account. Conventionally there are numerous 3D measuring methods, such as, for example, phase-coded active triangulation or laser scanning, which are suitable in principle for the application described. However, these methods are tailored to the measurement of non-transparent surfaces such as often occur in industrial metrology. However, organic tissues have a significantly more complex interaction with light, are partly wave-dependently transparent and have a light scattering capability in the volume which significantly changes the structure of a projected pattern and makes it difficult to recognize in a camera image for 3D data reconstruction in active triangulation methods. As a result, gaps arise in the 3D surface or the measurement uncertainty can increase greatly.

In the area of dental medicine, monochromatic light is conventionally used for phase triangulation and a white colorant is sprayed on in order to prevent light from penetrating into the tooth enamel. For the patient this is an unpleasant additional process step that adversely affects acceptance of the method.

A method better suited to 3D applications appertaining to medical technology is disclosed in WO 01/48438. This disclosure proposes providing a particularly compact and therefore disturbance-proof color pattern for a coding by means of the variation of a two-dimensional color pattern consisting of colored pattern elements. The aim is to determine a displacement position for a pattern element in the image recording of the two-dimensional color pattern projected onto an object. The three-dimensional data of an object point can be calculated by means of subsequent triangulation with a known position of the projector in a camera.

Originally, color coded triangulation (CCT) was likewise developed for applications appertaining to medical technology and affords significant advantages in the measurement of semitransparent diffusely scattering media. Applications may be a three-dimensional measurement of the human face for biometric use in the cosmetics industry, three-dimensional scanning of ear impressions, in order to produce hearing aids which are optimally adapted by means of these data, or direct scanning of the surface of the auditory canal using a specially developed CCT scanner. The advantage of this measuring method is that it affords many advantages of 3D measurement by means of active triangulation and moreover is very fast and comparatively robust. Fast means that it is able to measure in real time, since only one image recording is required for the reconstruction of the three-dimensional data sets. Robust means that, as a result of the use of the color coding of the projected pattern, it enables a comparatively good data reconstruction even in the case of biological surfaces, since it searches for color transitions or color edges during decoding and dispenses with the purely intensity-based data reconstruction.

Color triangulation CCT hitherto has involved choosing color fringe patterns having identical fringe widths for all colors. This is an expedient approach in the case of objects having no or a very small penetration depth into the object medium and the value of the modulation transfer function is virtually identical for all colors (light wavelengths). In the case of biological objects, the modulation transfer function (MTF) falls with the degree of volume scattering particularly at high spatial frequencies. The volume scattering tends to increase with the wavelength. In actual fact the effect is also dependent on the layer structure of, for example, human skin. Corresponding scatterings are not taken into account for the design of conventional color patterns.

In the dental area, the surface of teeth is scanned for adapting accurately fitting crowns, etc. In this case, too, it has been found that volume scattering makes it difficult to register valid measurement points.

SUMMARY

An aspect relates to providing an apparatus and a method for the three-dimensional measurement or 3D measurement of transparent, in particular partly transparent, and scattering, in particular diffusely scattering, surfaces with effectively decreased contrast reduction and effectively increased measurement accuracy in comparison with conventional solutions. In particular, for this purpose for example in the case of biological tissue wavelength-dependent penetrability into materials forming the surfaces and resultant volume scatterings are intended to be taken into account.

In accordance with a first aspect, an apparatus for determining three-dimensional surface coordinates of an object by means of optical color triangulation is claimed, comprising a projector device for illuminating the object with a set color fringe pattern, wherein the color fringe pattern extends along an axis and consists of lines which are perpendicular thereto and which have a different selection of spectral components of the projected light in each case with respect to adjacent lines; an acquisition device arranged in a known relative position with respect to the projector device and serving for recording an image of the object onto which the color fringe pattern was projected once; a computer device for calculating the three-dimensional surface coordinates by means of identifying the selection of the spectral components of a respective line and acquiring a respective transition of two lines adjoining one another, wherein for all lines, by means of the projector device, the width of a respective projected line in accordance with the volume scattering effects of the spectral components selected for the line is set in such a way that, in the recorded image of the line, all contrast maxima of all spectral components of said line are equal to a minimum contrast value.

In accordance with a second aspect, a method for determining three-dimensional surface coordinates of an object by means of optical color triangulation is claimed, comprising the following steps: illuminating the object with a set color fringe pattern, said illuminating being performed by means of a projector device, wherein the color fringe pattern extends along an axis and consists of lines which are perpendicular thereto and which have a different selection of spectral components of the projected light in each case with respect to adjacent lines; recording an image of the object onto which the color fringe pattern was projected once, said recording being performed by means of an acquisition device arranged in a known relative position with respect to the projector device; calculating performed by means of a computer device the three-dimensional surface coordinates by means of identifying the selected spectral components of a respective line and acquiring a respective transition of two lines adjoining one another, and setting for all lines, by means of the projector device, the width of a respective projected line in accordance with the volume scattering effects of the spectral components selected for the line in such a way that, in the recorded image of the line, all contrast maxima of all spectral components of said line are equal to a minimum contrast value. It has advantageously been recognized that by means of the design of the width of the color fringes or lines according to the degree of volume scattering, the latter can be compensated for. In this way, the same contrast value is obtained for all colors or spectral components used. What is advantageous in this case is that the number of measurement values identifiable as valid rises in the case of biological objects. Hole regions in the 3D image are avoided. This concerns pixels along a critical line that is only weakly identifiable.

In accordance with one advantageous configuration, for lines having in each case at least two selected spectral components, by means of the projector device, the width of the respective line can be set in accordance with the volume scattering effects of the spectral components selected for the line in such a way that, in the recorded image of the line, regions of maximum gradient in the contrast profiles of said spectral components coincide.

In accordance with a further advantageous configuration, the minimum contrast value is the value of the contrast transfer function of a pattern line having an invariable smallest width and a single spectral component consisting of a shortwave color that brings about a relatively smallest volume scattering effect.

In accordance with a further advantageous configuration proceeding from the invariable smallest width of the pattern line, the widths of the other lines can remain unchanged or can have been increased proceeding from said smallest width.

In accordance with a further advantageous configuration the color that brings about a relatively smallest volume scattering effect can be blue.

In accordance with a further advantageous configuration at least one spectral component can correspond to an individual color.

In accordance with a further advantageous configuration the projector device can generate the selected spectral components by means of mixing the individual colors red, green, blue.

In accordance with a further advantageous configuration the acquisition device can have a red-green-blue filter.

In accordance with a further advantageous configuration the invariable smallest width can be at least $1/12$ mm.

BRIEF DESCRIPTION

Some of the embodiments will be described in detail, with reference to the following figures, wherein like designations denote like members, wherein.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

DETAILED DESCRIPTION

Figure 1:
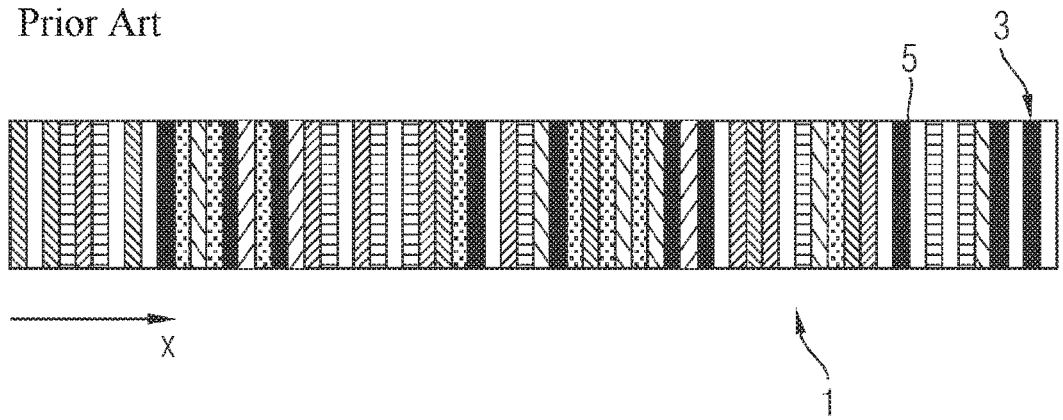
FIG. 1 shows one exemplary embodiment of a conventional color fringe pattern.

FIG. 1 shows one exemplary embodiment of a conventional color fringe pattern 1. A prerequisite in the case of triangulation is that a pattern projected onto a surface is deformed only by the surface shape, since the information about the three-dimensional shape is contained only in this deformation and is not additionally changed in terms of its structure and its contrast by the penetration into materials. This brings about an increased measurement uncertainty, missing pixels and also an increased susceptibility to disturbances with regard to extraneous light. FIG. 1 shows one color coded pattern conventionally used for CCT. The color fringe pattern 1 extends along an axis x. The color pattern 1 consists of lines 3 which are perpendicular to said axis x and which have a different selection of spectral components of the projected light in each case with respect to adjacent lines. Three-dimensional surface coordinates can be determined by means of identifying the selection of the spectral components of a respective line and acquiring a respective transition 5 of two lines 3 adjoining one another. The conventional approach involved choosing color fringe patterns having identical fringe widths for all colors.

If such a color fringe pattern 1 having in each case identical line widths were projected onto a surface which scatters the light color-neutrally in all spatial directions, then the contrast in an image recorded by an acquisition device or camera would be equally good for all wavelengths and colors, wherein the color transitions 5 could be detected in a simple manner. However, color-selective different penetration of light into a body and a different scattering capability alter the pattern to be imaged in terms of sharpness and contrast.

Figure 2:
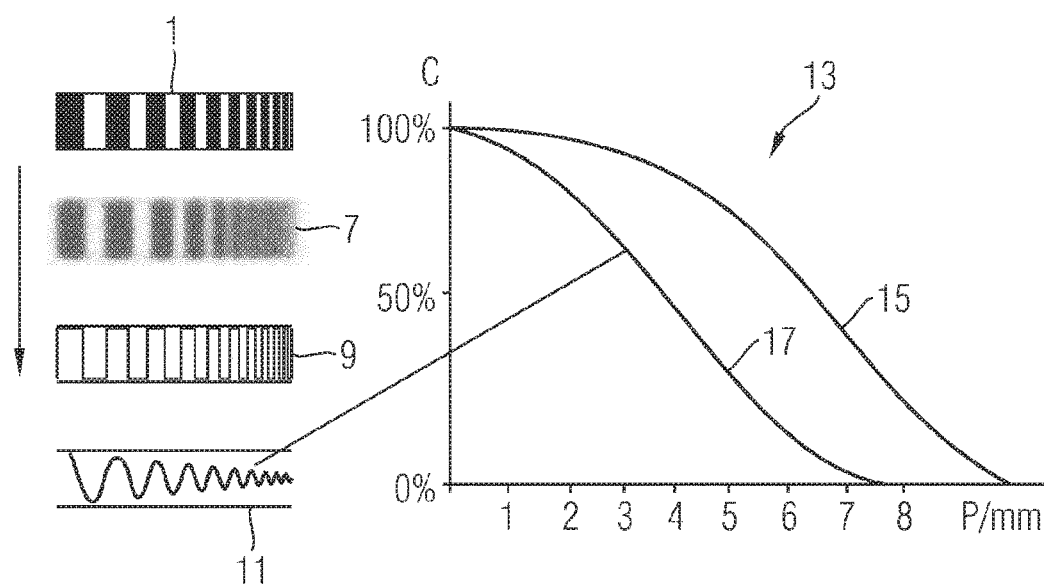
FIG. 2 shows modulation transfer functions of different systems.

FIG. 2 shows these influences. On the left-hand side of FIG. 2, in the direction of the arrow the illustration shows how a line pattern on an object is acquired in the recorded image.

A fringe pattern 1 is transformed into a corresponding image 7. Reference sign 9 shows the corresponding signal modulation by the object. Reference sign 11 shows the modulation arising on account of the contrast losses in the recorded image 7. Technically that means an impairment of an original modulation on account of the modulation transfer function (MTF) of, for example, biological tissue. FIG. 2 shows two modulation transfer functions on the right-hand side, which illustrates contrast profiles as a function of the spatial frequency firstly for a good system 15 and secondly for an impaired system 17. The spatial frequency is defined by the number of line pairs per millimeter (mm). A modulation transfer function MTF can likewise be designated as contrast transfer function.

FIG. 2 shows as functions on the right the modulation transfer function 15 of a good system and on the left a modulation transfer function 17 that is impaired on account of volume scattering by comparison with the modulation transfer function 15.

The following figures elucidate the concept of the present invention on the basis of exemplary embodiments. The development of new color code patterns for an optical triangulation particularly in the case of biological surfaces necessitates an accurate knowledge of the optical parameters and a description of the light propagations in the tissue. The optical parameters of tissue are wavelength-dependent and encompass an absorption coefficient, a scattering coefficient, an angular distribution of the scattering, and a refractive index. The angular distribution of the scattering is characterized by a g-factor and a phase function, for example. To a rough approximation, however, it can be stated that in homogeneous diffusely scattering media long-wave light penetrates into the material to a greater extent and brings about a larger volume scattering effect. This means that if an infinitesimally small light spot is projected onto the object, then the photons that are not directly elastically reflected penetrate into the medium, are subjected to a multiplicity of photon scattering processes, which can be both elastic and inelastic, and reach the surface at other locations. A widening of the visible light spot takes place, namely all the more, the longer the light wavelength. What is crucial in the case of 3D measurement (three-dimensional acquisition) by means of color triangulation is, however, primarily the identification of the color or line and the detection of the color transition or of the respective color edge. This is partly prevented by the volume scattering effect since the contrast from ((Max−Min)/(Max+Min)) decreases and the signal-to-noise ratio correspondingly decreases.

Figure 3A:
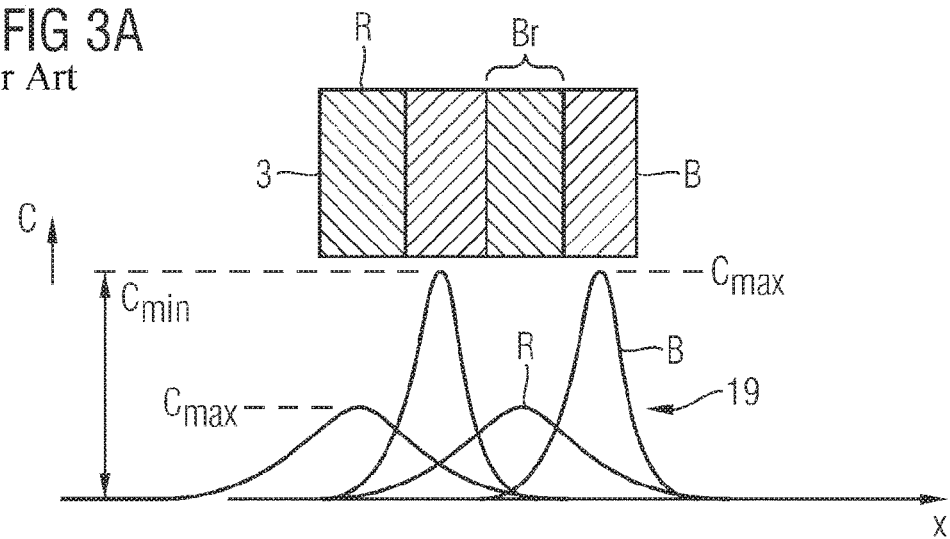
FIG. 3a shows a further exemplary embodiment of a conventional color fringe pattern.

FIG. 3a shows a further exemplary embodiment of a conventional color fringe pattern. Red lines R and blue lines B are arranged alternately in succession. Each of the lines 3 has in each case a uniform width Br, which is identical for all lines 3. Contrast profiles for each of the lines 3 after scattering at a volume scatterer are illustrated underneath. These contrast profiles can be acquired by means of an acquisition device of the apparatus according to embodiments of the invention. Each of these contrast profiles C exhibits a rise in contrast up to a contrast maximum CMax and a subsequent fall in a respective contrast curve. The contrast curves are axially symmetrical. FIG. 3a shows clearly that a volume scattering effect for the color blue B is smaller than the volume scattering effect of the color red R. Accordingly, the contrast profile 19 of the color blue B has a larger contrast maximum CMax than the contrast profile 19 of the color red R.

Figure 3B:
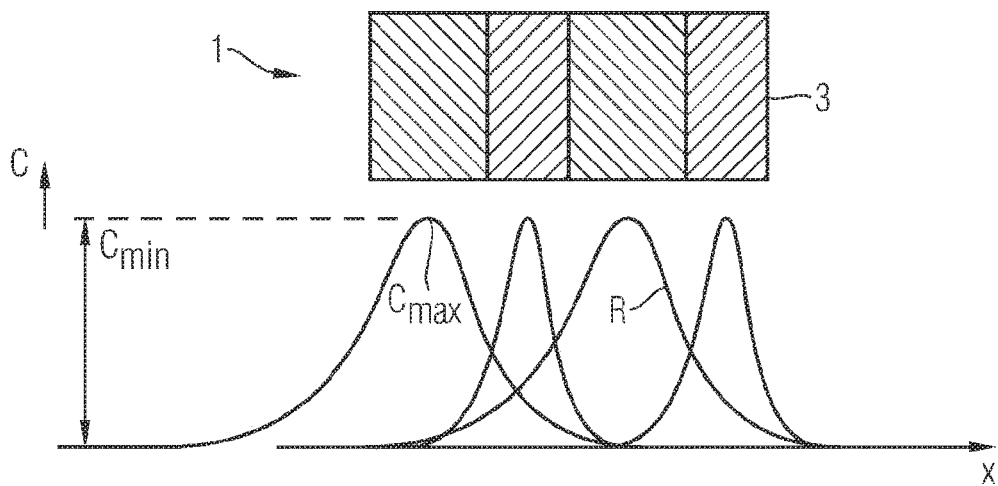
FIG. 3b shows one exemplary embodiment of a color fringe pattern.

FIG. 3b then shows a procedure according to embodiments of the present invention. The width of the projected line 3 is adapted to the respective volume scattering effect of the respective color. In accordance with FIG. 3b, the width of a line 3 having red color R is increased in such a way that the contrast maximum CMax of the contrast profile 19 of the red line 3 is increased. This widening can be performed until the contrast maximum CMax of the red line corresponds to the contrast maximum CMax of the blue line. The width of a respective blue line remains unchanged.

Figure 4:
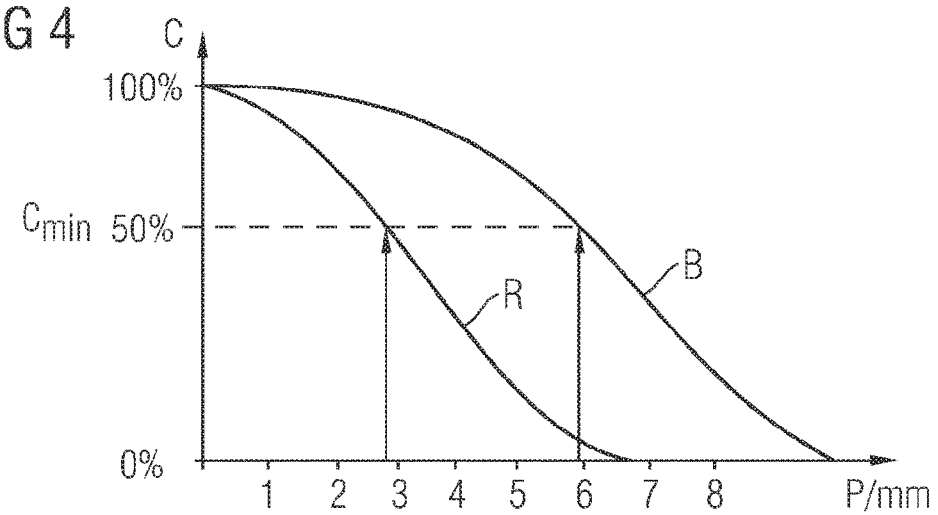
FIG. 4 shows modulation transfer functions of different individual colors.

FIG. 4 shows an illustration of the modulation transfer functions of lines of the color blue B and the color red R. Proceeding from the color blue, a specific contrast value is attained for said color in the case of a width assigned to the color blue B. Said contrast value is then defined as the minimum contrast value CMin. In order that a red line likewise brings about the same minimum contrast value CMin in the recorded image, the width for each red line must be made greater in order to obtain the same contrast as in the case of the blue fringe. In accordance with this exemplary embodiment of a color pattern 1 according to the invention, the widths of the red lines 3 were doubled. The horizontal axis of the coordinate system in accordance with FIG. 4 denotes the number of line pairs per mm. Line pairs are designated by the letter P.

Figure 5A:
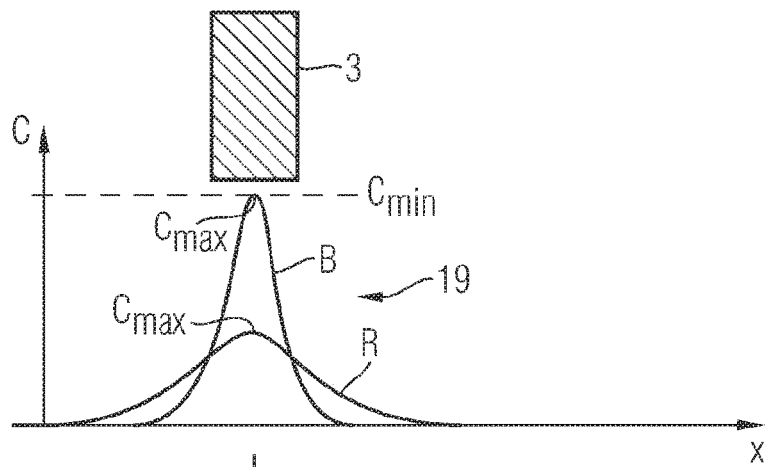
FIG. 5a shows contrast profiles of a conventional line consisting of mixed colors.
Figure 5B:
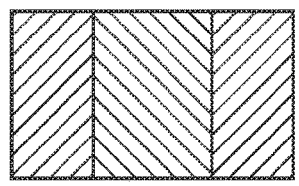
FIG. 5b shows a depiction (color-dependent widening) of the line in the eye after scattering at a volume with color-dependent scattering capability.
Figure 5C:
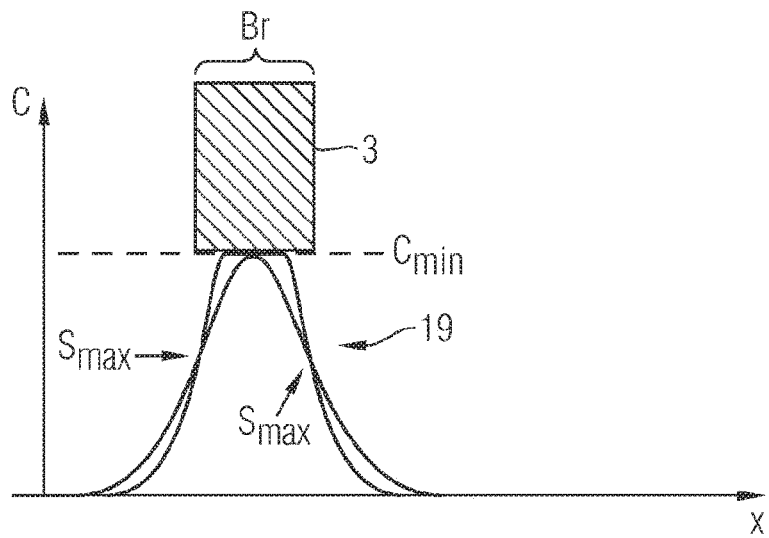
FIG. 5c shows contrast profiles of the line set.

FIGS. 5a to 5c show a solution according to embodiments of the invention for the case where a respective color of a line 3 is generated as a mixed color by means of a projector device. The image recording in the case of CCT is effected, for example, by means of one-chip cameras or three-chip cameras. That is to say that if a color pattern is formed only by mixing the colors red, green and blue (RGB mixing), the color pattern is demixed again by the RGB filters of the acquisition device or camera. In this regard, an edge overlap is not a disturbance in the detection of the color transition, since a color edge can be determined unambiguously in principle for any color. FIGS. 5a to 5c then show a second exemplary embodiment of a color pattern according to the invention. The color pattern here has only one illumination spot, which can likewise be designated as line 3. The composition of the spectral components of said line is generated here by means of mixed colors. FIG. 5a shows the contrast profile in the recorded image after volume scattering, wherein the illumination spot or the line 3 was generated by means of mixing the color red R and blue B. In the case of such mixed colors, the volume scattering effect can spatially demix the involved RGB components in the biological medium. This means that edge transitions each have a chromatic aberration (formation of a color fringe).

FIG. 5b shows how the very small violet spot 3 which was generated by mixing red and blue in accordance with FIG. 5a and was projected onto an object to be measured is identified by an eye. The corresponding observation by the eye in accordance with FIG. 5b shows that the eye changes the hue of the violet spot 3 and generates a red color fringe on the left and right thereof. With the use of a camera with RGB filter as acquisition device, the mixed color violet is demixed and would be detected as a blue spot and a dark-red spot, wherein the red spot would have a larger diameter.

FIG. 5c then shows an adaptation according to embodiments of the invention of the original line in accordance with FIG. 5a. The width of the fringe or of the line 3 which was generated with mixed colors is chosen in such a way that the modulation transfer functions MTF for both colors—which here are red and blue—are virtually of identical magnitude and exceed a minimum value and in addition the regions of maximum gradient of the contrast profiles 19 in the recorded image coincide. The regions of maximum gradient are identified by SMax. By means of the solutions according to embodiments of the invention, a three-dimensional measurement by means of CCT is effectively improved.

An apparatus and a method for determining three-dimensional surface coordinates of an object by means of optical color triangulation are proposed, wherein all lines of a color fringe pattern in each case have a width set in such a way that, in a recorded image of the line, all contrast maxima CMax of all spectral components of a line 3 are equal to a minimum contrast value CMin. Proceeding from an invariable smallest width of a pattern line 3a with a spectral component of highest contrast, further lines 3 can be correspondingly widened. The embodiment of the invention is particularly advantageously suitable for a 3D measurement in the case of biological tissue which can be transparent and scattering.

Figure 6:
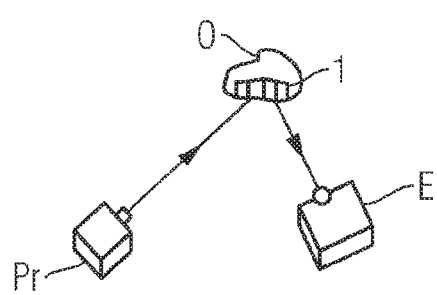
FIG. 6 shows an embodiment of an apparatus according to an embodiment of the invention.

In FIG. 6, an apparatus for determining three-dimensional surface coordinates of an object O by means of optical color triangulation is shown, comprising a projector device Pr for illuminating the object O with a set color fringe pattern 1, wherein the color fringe pattern 1 extends along an axis and consists of lines which are perpendicular thereto and which have a different selection of spectral components of the projected light in each case with respect to adjacent lines; an acquisition device E arranged in a known relative position with respect to the projector device Pr and serving for recording an image of the object O onto which the color fringe pattern 1 was projected once; a computer device for calculating the three-dimensional surface coordinates by means of identifying the selection of the spectral components of a respective line and acquiring a respective transition of two lines adjoining one another, wherein for all lines, by means of the projector device Pr, the width of a respective projected line in accordance with the volume scattering effects of the spectral components selected for the line is set in such a way that, in the recorded image of the line, all contrast maxima of all spectral components of said line are equal to a minimum contrast value.

The invention claimed is:

1. An apparatus for determining three-dimensional surface coordinates of an object by means of optical color triangulation, comprising:
    a projector device for illuminating the object with a set color fringe pattern, wherein the color fringe pattern extends along an axis and consists of lines which are perpendicular thereto and which have a different selection of spectral components of the projected light in each case with respect to adjacent lines;
    an acquisition device arranged in a known relative position with respect to the projector device and serving for recording an image of the object onto which the color fringe pattern was projected once;
    a computer device for calculating the three-dimensional surface coordinates by means of identifying the selection of the spectral components of a respective line and acquiring a respective transition of two lines adjoining one another, wherein for all lines, by means of the projector device, the width of a respective projected line is set wherein, in the recorded image of the line, all contrast maxima (Cmax) of all spectral components of said line are equal to a minimum contrast value (Cmin).

2. The apparatus as claimed in claim 1, wherein for lines having in each case at least two selected spectral components, by means of the projector device, the width of the respective line is set wherein, in the recorded image of the line, regions of maximum gradient in the contrast profiles of said spectral components coincide.

3. The apparatus as claimed in claim 1, wherein the minimum contrast value (Cmin) is the value of the contrast transfer function of a pattern line having an invariable smallest width and a single spectral component consisting of a short-wave color that brings about a relatively smallest volume scattering effect.

4. The apparatus as claimed in claim 3, wherein proceeding from the invariable, smallest width of the pattern line, the widths of the other lines have remained unchanged or have been increased proceeding from said smallest width.

5. The apparatus as claimed in claim 3, wherein the color that brings about a relatively smallest volume scattering effect is blue.

6. The apparatus as claimed in claim 3, wherein the invariable smallest width is at least $\frac{1}{12}$ mm in the object region.

7. The apparatus as claimed in claim 1, wherein at least one spectral component corresponds to an individual color.

8. The apparatus as claimed in claim 1, wherein the projector device generates the selected spectral components by means of mixing the individual colors red, green, blue.

9. The apparatus as claimed in claim 1, wherein the acquisition device has a red, green, blue filter.

10. A method for determining three-dimensional surface coordinates of an object by means of optical color triangulation, comprising the following steps:
    illuminating the object with a set color fringe pattern, said illuminating being performed by means of a projector device, wherein the color fringe pattern extends along an axis and consists of lines which are perpendicular thereto and which have a different selection of spectral components of the projected light in each case with respect to adjacent lines;
    recording an image of the object onto which the color fringe pattern was projected once, said recording being performed by means of an acquisition device arranged in a known relative position with respect to the projector device;
    calculating—performed by means of a computer device—the three-dimensional surface coordinates by means of identifying the selected spectral components of a respective line and acquiring a respective transition of two lines adjoining one another, wherein by setting for all lines, by means of the projector device, the width of a respective projected line wherein, in the recorded image of the line, all contrast maxima (Cmax) of all spectral components of said line are equal to a minimum contrast value (Cmin).

11. The method as claimed in claim 10, wherein for lines having in each case at least two selected spectral components, by means of the projector device, the width of the respective line is set wherein, in the recorded image of the line, regions of maximum gradient in the contrast profiles of said spectral components coincide.

12. The method as claimed in claim 10, wherein the minimum contrast value (Cmin) is the value of the contrast transfer function of a pattern line having an invariable smallest width and a single spectral component consisting of a short-wave color that brings about a relatively smallest volume scattering effect.

13. The method as claimed in claim 12, wherein proceeding from the invariable, smallest width of the pattern line, the widths of the other lines remain unchanged or are increased proceeding from said smallest width.

14. The method as claimed in claim 12, wherein the color that brings about a relatively small volume scattering effect is blue.

15. The method as claimed in claim 12, wherein the invariable smallest width is at least $\frac{1}{12}$ mm.

16. The method as claimed in claim 10, wherein at least one spectral component corresponds to an individual color.

17. The method as claimed in claim 10, wherein the projector device generates the selected spectral components by means of mixing the individual colors red, green, blue.

18. The method as claimed in claim 10, wherein the acquisition device has a red, green, blue filter.

* * * * *